July 12, 1927.
E. M. SMITH ET AL
ICE CYCLE
Filed Dec. 10, 1925
1,635,292
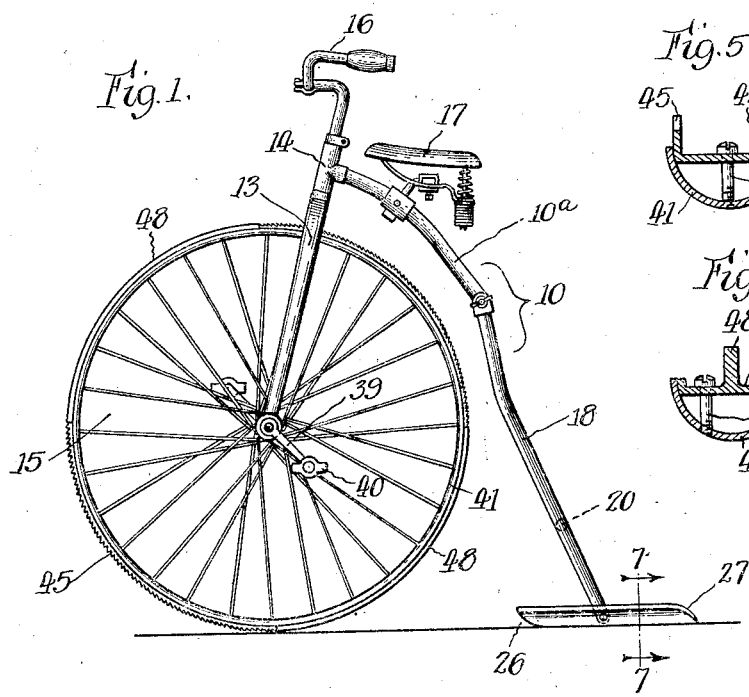
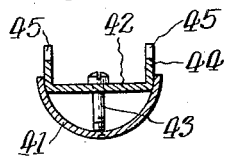
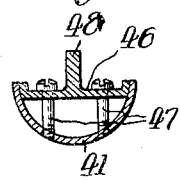
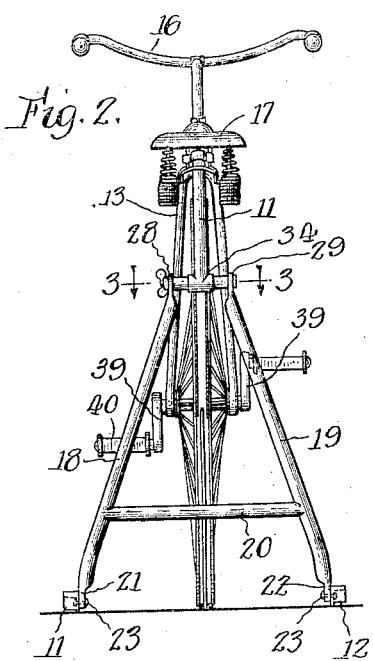
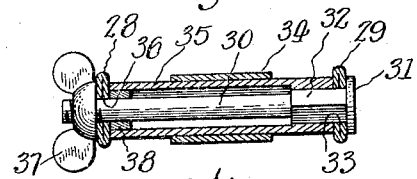
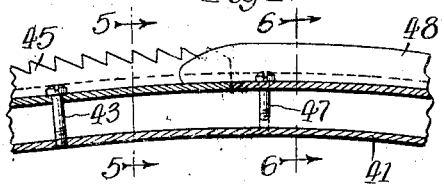
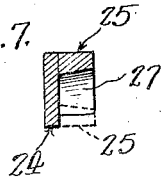
Inventors:
Ethel M. Smith,
Samuel B. Smith,
By Chindall Parker Railson
Attys Patented July 12, 1927.

1,635,292

UNITED STATES PATENT OFFICE.

ETHEL M. SMITH AND SAMUEL BREESE SMITH, OF CHICAGO, ILLINOIS.

ICE CYCLE.

Application filed December 10, 1925. Serial No. 74,428.

This invention relates to what may be called an ice cycle, i. e., a pedally-actuated skating or sliding vehicle for snowy and icy surfaces.

One object of the invention is to provide a suitable rotary driving element for the vehicle, of such a character that it serves as an ice-gripping element to propel the vehicle when rotated and which may be non-rotatably held to serve as a skate or runner for the vehicle.

Another object is to provide a runner which may present either a narrow or a broad surface to the surface on which the vehicle is to be used.

In the accompanying drawings there is shown an exemplary embodiment of the invention constructed on the lines of an ordinary velocipede or tricycle. The device in the present instance is provided with two rear runners and with a forward runner or driving element. It is to be understood, however, that the present illustration and the following description of the exemplary embodiment are not to be construed as a limitation of the invention to the form disclosed. It will be apparent that the invention is susceptible of various other embodiments and arrangements of the parts to constitute a vehicle embodying the principles of the invention as expressed in the appended claims.

In the drawings Figure 1 represents a side view of the ice cycle.

Fig. 2 represents a rear view of the ice cycle.

Fig. 3 shows in detail an optional joint in the frame construction.

Fig. 4 shows a portion of the periphery of the wheel illustrating the ice-runner and the ice-gripping portion.

Figs. 5 and 6 show cross sections of the wheel felly taken on the lines 5—5 and 6—6 of Fig. 4.

Fig. 7 is a cross section of a rear runner on the line 7—7 of Fig. 1.

In the vehicle of the drawings there is provided a frame 10 which has at the rear end two runners 11 and 12. The forward portion of the vehicle is comprised of a forked frame member 13 bearing in the frame 10 at the point 14 and carrying a supporting wheel 15. Steering bars 16 of the ordinary bicycle type are provided in the upper end of the forked frame member 13. On the frame member 9 there is located a seat 17 of any well known type such as is commonly found in velocipedes and bicycles.

The rear runners 11 and 12 are carried on a forked A-shaped frame member comprising the legs 18 and 19 and the cross member 20. All the framework pieces of the ice cycle are preferably tubular in form. This is especially true of the members 18 and 19 which are herein shown flattened at their ends and bent so that the flattened ends lie in parallel vertical planes. At the bottom ends 21 and 22, respectively, of the legs 18 and 19, the runners 11 and 12 are pivotally secured by means such as rivets 23 or other equivalent structure. Thus the runners are pivoted to maintain a parallel relation in the direction of travel of the vehicle. Because of their mounting on the outside of the flattened ends of the legs, the runners are capable of complete rotation in a vertical plane. This relation of the runners to the frame of the vehicle keeps the two rear runners always parallel and permits accommodation of the runners to irregularities of the icy surface. It also permits reversal of the runners. Because of the reversibility of the runners a dual runner construction can be provided. Each runner comprises a steel bar which is provided on one edge with a narrow surface 24 and on the opposite edge with a broad surface 25. Thus the runner may be inverted to accommodate the vehicle to various conditions of the icy or snowy surface upon which the vehicle is to be used. Each runner surface has a curved forward end as indicated at 26 and 27.

The upper ends 28 and 29 of the A-shaped frame are secured to a frame member 10ª so that there is normally a rigid relation between them. However, a hinging relation is desired within the frame 10 between the member 10ª and the A-shaped rear support. This is in order to permit folding of the leg forwardly to facilitate shipping and packing. Any sort of pivotal connection may be made. In the present instance it comprises a bolt 30 passing through the flattened ends 28 and 29 of the A-shaped rear support. The bolt has a head 31 and a square shank portion 32 which fits a corresponding square hole 33 in the leg 29. The frame bar 10ª has a tubular T-shaped end 34 into which is rigidly secured a tubular sleeve 35 of such a length that it fits between the spaced flattened ends 28 and 29 of the A-shaped member. The bolt passes through the hole 36 in the flattened end 28. A thumb nut 37 serves to clamp the parts in rigid relation. If desired a spacing collar 38 may be carried within the sleeve member 34 to hold the parts in concentric relation.

The supporting and driving wheel 15 has rigid with its axle two oppositely directed crank arms 39 carrying foot pedals 40 by which the wheel is driven by one sitting on the seat 17. The wheel here shown is constructed the same as an ordinary bicycle wheel which has a concave felly or rim 41 to which arcuate ice-gripping members and arcuate runners are secured. Preferably the periphery of the wheel consists of two diametrically opposite gripping segments and two diametrically opposite runner segments. The ice-gripping members may assume a variety of forms but preferably comprise an arcuate channel-shaped member 42 held in the felly across the open width thereof by screws 43. The sides 44 of the channel bar are notched or otherwise suitably cut away or formed to provide ice-gripping teeth or projections 45. In order to permit the vehicle to be used for coasting purposes, a portion of the rim is formed with a runner surface, the ice-gripping teeth being absent from this portion. For this purpose a T-shaped arcuate member is provided on the felly having an arcuate flat member 46 coextensive with the bottom side of the channel 42 and similarly held to the felly by screws 47. The leg 48 of the T-bar serves as an ice-runner, it projecting from the wheel in the plane thereof to support the same on the ice. The two arcuate members 42 and 46 are positioned on the felly end to end as shown in Fig. 4, the ice runner 48 extending circumferentially a short distance between the ice-gripping sides of the channel.

In use the occupant of the vehicle may propel it forwardly by reason of the engagement of the teeth 45 with the ice. The momentum or the sliding of the wheel on the ice readily serves to carry the runners 48 past the point of contact on the ice. When a sufficient speed has been obtained the rider need merely hold one pedal down whereupon the wheel stops revolving with one of the runners 48 in sliding contact with the ice.

It will thus be seen that the invention provides a vehicle of a nature which serves both for propelling the same and for coasting freely upon the ice.

We claim as our invention:

1. A wheel having an arcuate channel member secured to its periphery, said channel member having its sides projecting outwardly, said sides being cut to form ice gripping teeth therein, and having an arcuate T-shaped member on its periphery at the end of the channel member, the leg of the T extending outwardly in the plane of the wheel to form an ice runner, said runner extending circumferentially a short distance between the ice-engaging sides of the channel member.

2. A wheel having a felly with a concave periphery, a flat arcuate member across the open width of the felly, means to secure the flat member to the felly, and supporting means for the wheel carried by the flat member for engagement with the surface on which the wheel must rest.

3. A cycle comprising a front wheel having a concave felly, a plurality of arcuate members adapted to fit about said felly, means for securing said members to the felly, portions of said members having ice-engaging teeth, and diametrically opposite portions having a runner surface.

In testimony whereof we have hereunto affixed our signatures.

ETHEL M. SMITH.
SAMUEL BREESE SMITH.